June 12, 1951  W. A. BRINKHURST  2,556,572
SCREW FEED

Filed Aug. 23, 1944  2 Sheets-Sheet 1

INVENTOR
WILLIAM A BRINKHURST
Ernest C Carver
ATTORNEY.

June 12, 1951     W. A. BRINKHURST     2,556,572
SCREW FEED

Filed Aug. 23, 1944     2 Sheets-Sheet 2

INVENTOR
WILLIAM A BRINKHURST
Ernest E Carver
ATTORNEY

Patented June 12, 1951

2,556,572

UNITED STATES PATENT OFFICE 2,556,572

SCREW FEED

William A. Brinkhurst, Vancouver, British Columbia, Canada

Application August 23, 1944, Serial No. 550,811

2 Claims. (Cl. 74—424.8)

My invention relates to improvements in screw feeds for translating rotary motion into lateral motion.

One of the objects of the invention is to provide means whereby a coarse pitch thread may be used to produce a lateral motion which would normally require a fine pitch thread. Other objects are to provide a ratio between the driver and driven member of the screw feed which is less to that obtained between the conventional screw and nut, and to obtain a plurality of lateral feed speeds from a single screw driven at any given speed.

The invention contemplates the use of a screw surrounded and adapted to be engaged by a nut having a substantially larger diameter than the screw both of which are cut to the same pitch, as will be more fully described in the following specification and shown in the accompanying drawings, in which.

In the drawings like characters of reference indicate corresponding parts in each figure.

The numeral 1 indicates generally a journal box adapted for attachment on a movable part of a machine, not shown. The journal box supports a pair of ball bearings 2 in which a screw shaft 3 suitably connected to another part of said machine is journalled. A nut 4 is freely rotatable within the journal box which is mounted eccentrically to the screw shaft 3 and is adapted to be engaged thereby.

The thread of the screw shaft and the nut are both cut to the same pitch, but the pitch diameter of said nut is substantially greater than that of the screw shaft, so that the screw shaft as shown will turn considerably more than one revolution for each revolution of the nut, consequently the journal box will advance lengthwise of the screw shaft less than one thread for each complete revolution of said shaft. The drive being in the nature of a rolling contact between the threads of the screw shaft and the nut causes relatively little wear.

Figure 3:
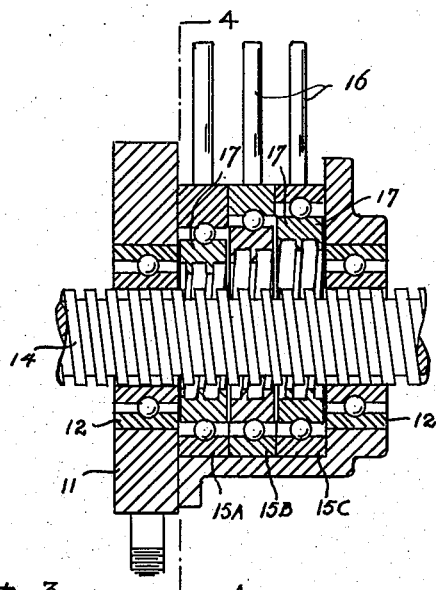
Fig. 3 is a longitudinal view of the device adapted to provide a variable speed ratio.
Figure 4:
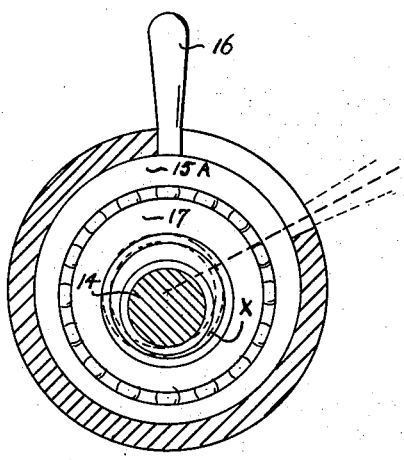
Fig. 4 is a sectional view taken on the line 4—4 of Figure 3.

In the device as shown in Figures 3 and 4, the journal box is indicated by the numeral 11 and is fitted with bearings 12 in which a screw shaft 14 is journalled. Between the bearings 12 a plurality of eccentric rings 15A, 15B and 15C are rockingly mounted, each of which is fitted with a lever 16 by which the rings are rocked. In each of these rings a nut 17 is mounted. These three nuts 17 are of different pitch diameters and all of them are larger in net pitch diameter than the pitch diameter of the screw shaft thread, so that said screw shaft can rotate freely without engaging any of the nuts. When the lever 16 is attached to the eccentric ring 15A is moved to the position shown in dotted line in Figure 4, its nut 17 is swung over as at X to mesh with the screw shaft 14 and, assuming the screw shaft to be rotating, to urge the journal box laterally at a speed proportionate to the diameters of the said nut and screw shaft.

Figure 5:
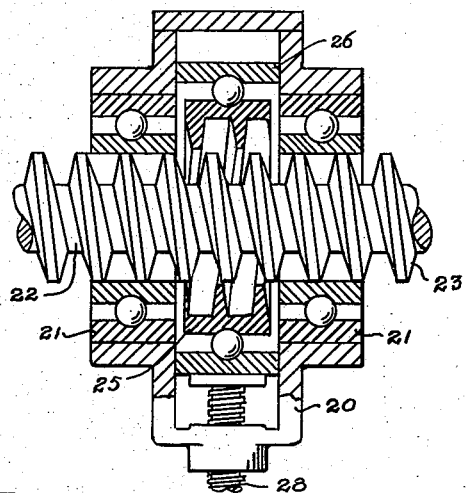
Fig. 5 is a longitudinal view of a modification providing a variable speed ratio.
Figure 6:
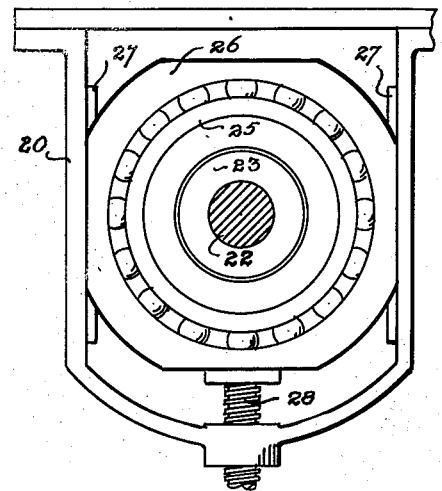
Fig. 6 is an end elevational view of Figure 5.

In the modification shown in Figures 5 and 6, the journal box is indicated by the numeral 20 and it is provided with bearings 21 for a screw shaft 22 having a tapered thread 23. A freely rotatable nut 25 having relatively wide spaces between its threads is journalled in a ring 26 which is slidable upon guides 27 provided in the journal box. The ring 26 is moved transversely of the bearings 21 by means of a screw 28. The speed ratio between the screw shaft and the nut will obviously vary according to the depth of engagement of the tapered thread 23 into the grooves of the nut 25.

Figure 7:
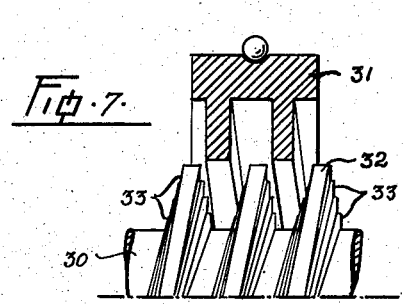
Fig. 7 is a further modification.

In the modification shown in Figure 7, the screw shaft is indicated by the numeral 30 and the freely rotatable nut by the numeral 31. The screw shaft 30 is provided with a tapered thread 32 divided into a plurality of parallel faces 33 each of which are capable of selective engagement with the inner portion of a face of the threads of the nut 31 according to the adjustment of the nut relative to the axis of the screw shaft, the spaces between the threads of the nut are sufficiently wide to permit the threads 32 to fully enter therein. If the nut is so set that it engages the outer thread face of the screw shaft, the differential between the engaging surfaces between screw shaft thread and nut thread will be slight, consequently the lateral traverse of the nut will be relatively slow, whereas if the inner face 33 of the screw shaft is engaging the nut the differential will be great, consequently the lateral traverse of the nut will be relatively fast. Obviously since the threads 32 are stepped it will be necessary in changing from one face to another to discontinue the driving thrust between the thread and the nut to permit the inner periphery of the nut to pass the outer periphery of the face to be engaged.

Figure 1:
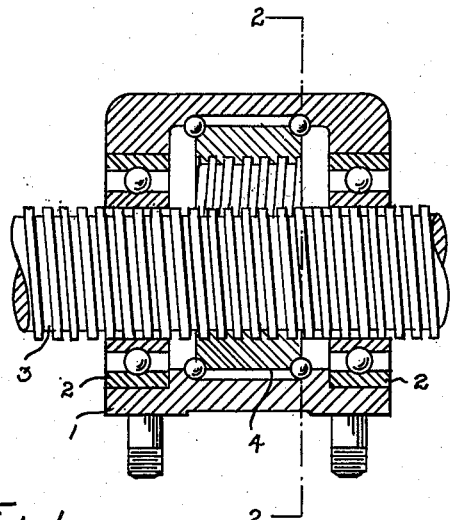
Fig. 1 is a longitudinal sectional view of the invention in its simple form.
Figure 2:
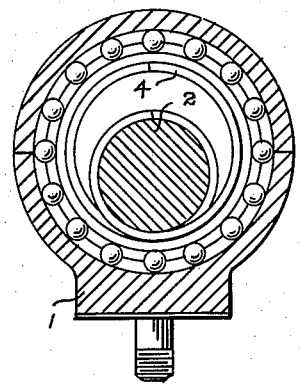
Fig. 2 is a transverse sectional view taken on the line 2—2 of Figure 1.
Figure 8:
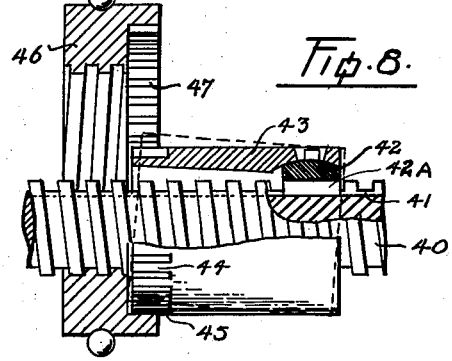
Fig. 8 is a longitudinal sectional view of the invention adapted for use on a screw cutting lathe.

In Figure 8, the screw shaft 40 is provided with a keyway 41 and its thread is fitted with a collar 42 having a key 42A. Universally mounted upon the collar and rotatable therewith, is a sleeve 43 which is provided with gear teeth 44 to form a pinion 45. Surrounding the screw shaft 40 is a freely rotatable nut 46 which is adapted to be mounted in a journal box as described in Figure 1, but not shown in this figure. The nut is provided with internal gear teeth 47 which are engaged by the teeth 44 of the pinion 45. The ratio between the pinion and the nut is co-ordinated so that when the nut is moved out of engagement with the screw shaft, it will continue to turn at the same speed as when engaged but without imparting any relative lateral movement between the parts. When the nut is moved in the opposite direction it will come into meshing engagement with the thread of the screw shaft without any lateral slip, irrespective of the amount of rotation of the parts while the threads were disengaged. By this means a positive movement is provided which is void of play or back lash and is therefore of particular value as a feed for screw cutting lathes and the like.

Figure 9:
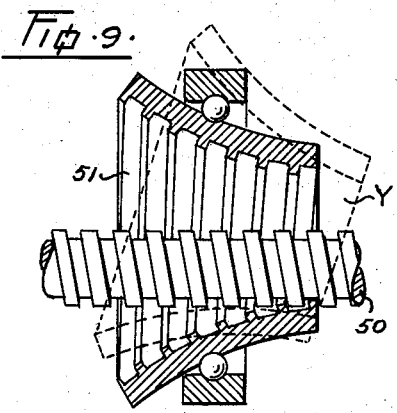
Fig. 9 is a longitudinal sectional view of a modification employing a bell shaped nut to provide extensive change in speed ratio.

The modification shown in Figure 9 includes a screw shaft 50 extending through a freely rotatable bell shaped nut 51 which is adapted for mounting in a journal box, not shown, and to be adjustable transversely of said screw shaft by suitable means, so that the screw shaft may be brought into driving engagement with any portion of the nut, one such position being indicated in dotted line as at Y. When the engagement of the screw shaft is adjacent the narrow end of the nut, the traverse of the nut along the shaft will be slow, and when it is adjacent the wide end the traverse will be fast.

Figure 10:
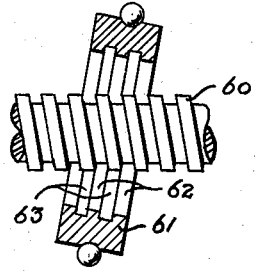
Fig. 10 is a longitudinal sectional view of a fast traverse modification of the invention.

In the modification shown in Figure 10, the screw shaft 60 is surrounded with a nut 61 which is adapted for mounting in a suitable journal box, not shown. The nut is provided with annular threads 62 defining annular grooves 63 into which the thread of the screw shaft projects. The nut is set in inclined position so that that portion of its threads which are in engaging contact with the thread of the screw shaft will be at the same angle at all times. This structure is designed for permanent engagement between screw shaft and nut, but obviously the nut could be mounted to provide for disengagement of the driving train.

It will be apparent that the principle involved in the invention will provide a structure where the greater the diameter of the nut used on a screw shaft over that of the shaft the greater will be the feed traverse and that conversely as the diameters of said nut and screw shaft approach each other the rate of feed will diminish.

It will also be apparent that any means may be employed to provide relative movement between the nut and screw shaft as may be required to suit the particular situation in which the device is to be incorporated.

Obviously the invention in its various forms is for the purpose of obtaining mechanical advantage in transmitting power, to actuate feed mechanisms, to provide means of measurement, to act as a mean of adjustment between co-ordinated parts and to perform innumerable other functions.

What I claim as my invention is:

1. A screw feed train comprising a screw shaft mounted within a journal box, a plurality of nuts freely rotatable within the journal box and surrounding the screw shaft, said nuts being of different internal diameters and normally out of engagement with the screw shaft, and means for selectively moving any of the nuts into engagement with the screw shaft, all of said nuts and said screw shaft being of identical thread lead.

2. A journal box having a screw shaft journalled therein, a second journal box mounted eccentrically of the first named journal box, an annular ring rockably mounted in said second box, a nut freely rotatable in said ring, means for rocking the ring, said nut being adapted to be brought into engagement with the screw shaft by rocking the ring, said screw shaft and said nut being of identical thread lead.

WILLIAM A. BRINKHURST.

REFERENCES CITED

The following references are of record in the file of this patent:

UNITED STATES PATENTS

| Number | Name | Date |
|---|---|---|
| 1,079,883 | Sayer et al. | Nov. 25, 1913 |
| 1,140,646 | Abernathy | May 25, 1915 |
| 1,538,091 | Cobb | May 19, 1925 |
| 1,724,616 | Rapellin | Aug. 13, 1929 |
| 2,134,748 | Baxter | Nov. 1, 1938 |
| 2,477,701 | McCallum | Aug. 2, 1949 |